Figure 1:
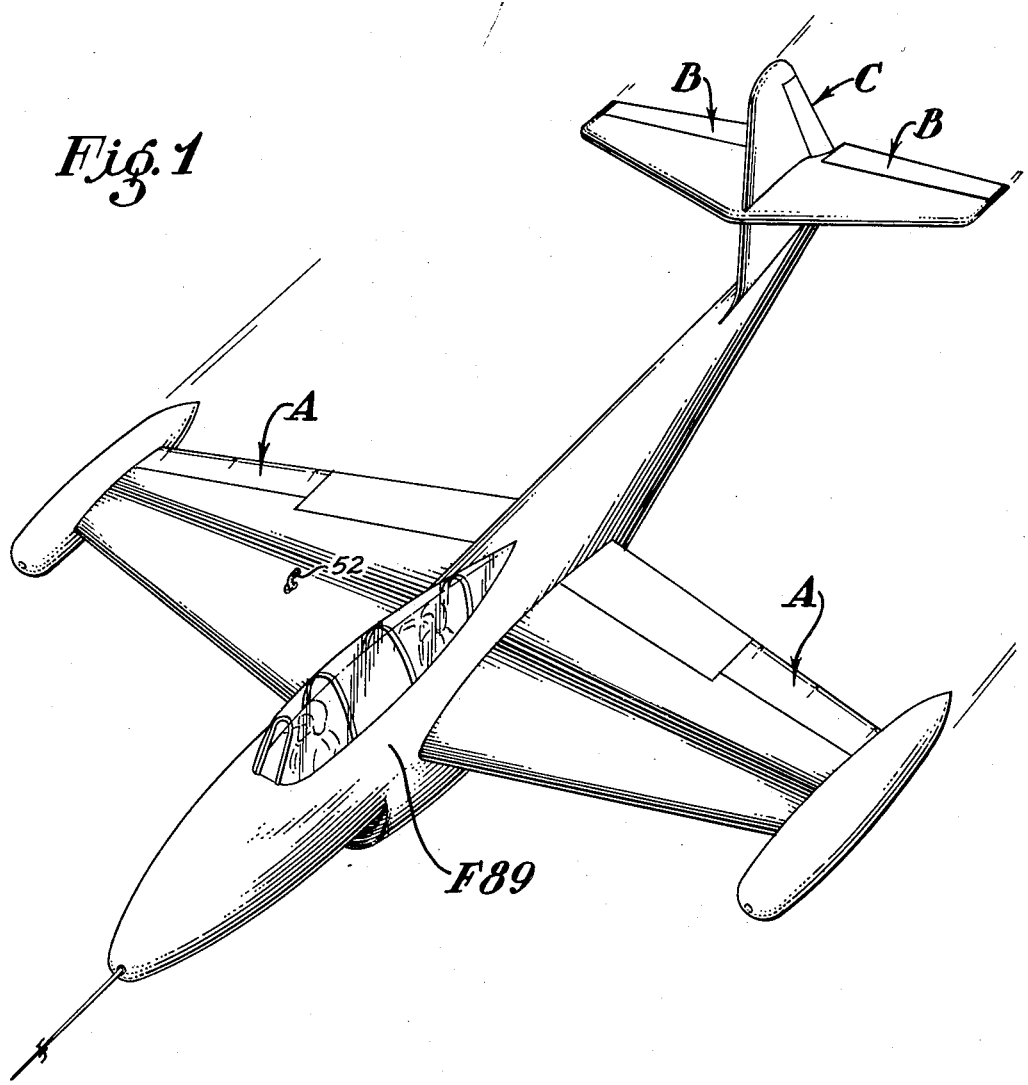

Feb. 14, 1956  H. E. METCALF  2,734,700
AIRPLANE CONTROL SYSTEM
Filed Nov. 25, 1950  2 Sheets-Sheet 1

INVENTOR:
HERBERT E. METCALF
By Herbert E. Metcalf
HIS PATENT ATTORNEY

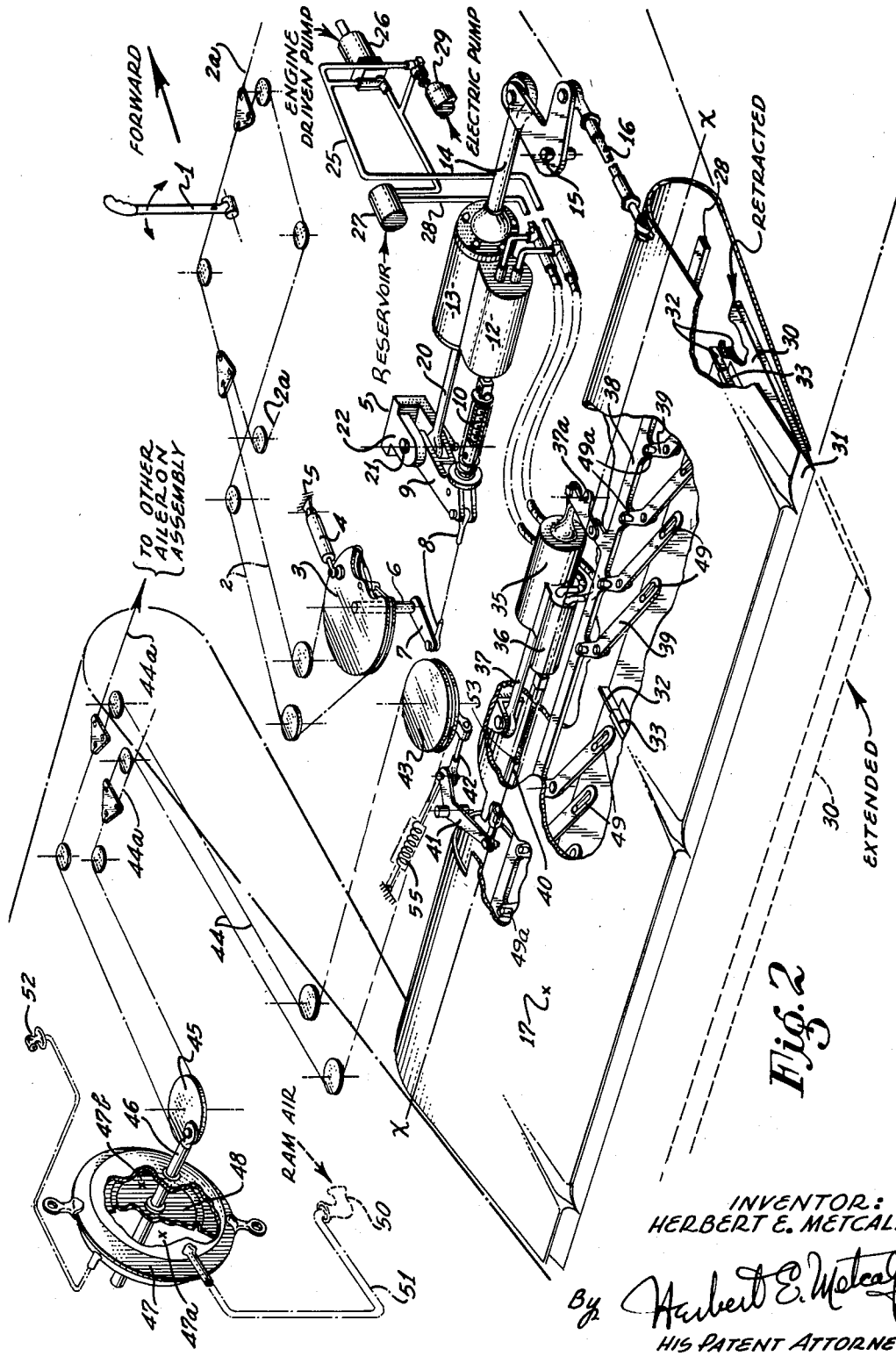

United States Patent Office 2,734,700
Patented Feb. 14, 1956

2,734,700

AIRPLANE CONTROL SYSTEM

Herbert E. Metcalf, Los Angeles, Calif., assignor to Northrop Aircraft, Inc., Hawthorne, Calif., a corporation of California Application November 25, 1950, Serial No. 197,617

5 Claims. (Cl. 244—42)

The present invention relates to airplane attitude control systems, and, more particularly, to attitude control systems wherein the area of an attitude control surface is automatically varied in accordance with the speed of the airplane to prevent over control at high speeds.

In modern high speed aircraft, such as fighter airplanes capable of 600 M. P. H. or better, the problem of effective attitude control at top speeds is serious. The control surfaces of the aircraft have to be sufficient in area to adequately control the airplane at take-off and landing speeds of around 100 M. P. H.; yet these same surfaces must not over-control the airplane at top speeds.

In airplanes such as the U. S. Air Force F-89 night fighter manufactured by the assignee of the present invention, a deflection of the elevator surfaces on the order of only one-tenth of one degree from neutral position, for example, at top speeds is sufficient to place the airplane into a steep climb or dive from level flight.

While this same problem occurs to some extent in high speed airplanes in which the attitude controlling surfaces are moved solely or partly by pilot force, it becomes increasingly serious in airplanes in which the surfaces are moved entirely by power; controlled by the pilot.

In the F-89, referred to above, the rudder, aileron and elevator surfaces are moved solely by hydraulic motors under pilot control. When attitude controlling surfaces are full power operated, with the pilot operating a stick sending signals only to the power motor actuating the surfaces, only minute stick movements are required to change the position of the surface.

Various expedients have been heretofore proposed tending to prevent excessive surface movement by stick motion at high speeds. Motion ratio changers have been utilized so that a greater stick stroke is required to move the surface at high speeds than at lower speeds, and as set forth in a copending application, Serial No. 46,877, filed August 30, 1948, entitled Motion Ratio Changer, now Patent No. 2,652,994, this ratio change can be placed under the control of an airspeed measuring device.

Devices have also been used to increase the resistance of the stick to movement from the neutral position as the airspeed increases. Because of the extreme sensitivity of airplane response to even the most minute movement of the attitude control surface, none of these expediences have proved to be wholly effective in solving the problem of control sensitivity at high speeds.

It is an object of the present invention to provide a means for decreasing the effective area of an attitude control surface in proportion to the increase in speed, thereby reducing the sensitivity of this surface to stick movement at high speeds.

It is another object of the present invention to provide such a means in which the aerodynamic response of the airplane can be maintained substantially constant with respect to stick movement over substantially the entire speed range of the airplane, or if desired, the aerodynamic response with respect to stick movement can be made to follow any other desired characteristic over the speed range of the airplane.

It is another object of the present invention to provide a means for continuously varying the area of an attitude control surface in an airplane in proportion to airspeed irrespective of the position of said attitude control surface.

In the drawings, which show diagrammatically one preferred form of the invention:

Figure 1 is a perspective view of a U. S. Air Force F-89 airplane showing the location of the attitude control surfaces that can be equipped with the present invention.

Figure 2 is a diagrammatic perspective view of a portion of the wing and one aileron of the airplane of Figure 1, showing the present invention as used for changing the area of said aileron.

Referring first to Figure 1, a perspective view of the U. S. Air Force all weather dual jet propelled fighter F-89 is shown, this airplane being of the 600 M. P. H.+ class. In consequence, the ratio of top speed to landing speed is greater than 6 to 1. Using conventional control surfaces, the ailerons A, the elevators B and the rudder C would be of sufficient area to provide adequate attitude control at take-off and landing speeds. However, at top speeds the area of each control surface is so relatively large that the slightest movement of the surface by the control stick causes a sharp aerodynamic response. One preferred means for changing the actual area of the ailerons in flight in accordance with airspeed to provide a minimum of control surface area at high speed is shown in Figure 2. It is to be understood that similar means can as well be applied to the elevators B and the rudder C, or to all three control elements.

In Figure 2, the control stick 1 of the airplane is connected by cables 2 to an actuating pulley 3. The neutral position of the stick is determined by a centering spring 4 attached to the airframe 5 and to pulley 3. The shaft 6 of the pulley 3 is extended and provided with an actuating arm 7 to move a valve actuating rod 8 connected to a valve actuating arm 9. Valve arm 9 is connected by a spring rod 10 to actuate a valve spool (not shown) in a hydraulic valve 12 solidly attached to a hydraulic cylinder 13. Cylinder 13 is attached by a head extension rod 14 to a bell crank 15 which is connected by an aileron actuating rod 16 to rotate aileron 17 on its axis X. The piston (not shown) of the hydraulic cylinder 13 is connected by a piston rod 20 to a pivot pin 21 in a fitting 22 attached to airframe 5. Valve arm 9 is also rotatable on pivot pin 21.

Hydraulic actuation of the hydraulic motor 12—13—20 is provided by fluid supplied through hydraulic pressure line 25 supplied by an engine driven pump 26 from a reservoir 27 receiving fluid from the motor through fluid return line 28. Emergency operation of the system is provided for by the use of an electrically driven standby pump 29. Actuation of the opposite aileron motor is provided through cables 2a.

It is noted in the construction shown and described that by having the valve 12 attached to cylinder 13 and with the cylinder attached to move with the surface, an extremely short follow-up circuit is provided wherein the surface instantly follows valve spool movement as determined by stick movement.

The system so far described is a full power attitude control system in which the pilot supplies only signals to the hydraulic motor valve 12 and receives no control surface force feedback whatsoever.

In order that the aileron 17 may have minimum area at top speeds and maximum area at lower speeds, in accordance with the present invention, I provide an aileron 17 with the proper airfoil section with a minimum area suitable for control at the top of the speed range, and with adequate stick movement to insure proper aerodynamic response without undue stick sensitivity. Such an aileron, however, will be found to be totally inadequate to properly control the airplane at landing speeds.

To increase the area of the aileron 17 to a point where it will be suitable for adequate control at low speeds, the aileron 17 is provided with an extensible plate 30 preferably positioned in a plane including the trailing edge of the control surface and the axis X of the aileron 17. The aft edge of plate 30 is sharpened to provide a portion 31 forming the trailing edge of the aileron 17 under all conditions, and plate 30 is provided with a plurality of parallel stiffening and guiding ridges 32 above and below plate 30, riding in aileron channels 33.

Plate 30 is extended rearwardly and retracted forwardly out of and into the aileron 17 by a hydraulic motor having a cylinder 35, valve 36 and piston rod 37 similar to the hydraulic motor 13 described for aileron 17 actuation; the hydraulic motor 35, 36, 37 being included within the aileron itself. In this instance, cylinder 35 is attached to one end of a lever link 37a which actuates transverse bar 38 to which is pivotably attached one end of each of a plurality of plate cranks 39. Lever link 37a is pivotally mounted onto the interior of the aileron 17, as are the centers of the cranks 39. The other ends of cranks 39 are pivotably attached to plate 30 and slots 49 and 49a are provided in the cranks 39 to allow straight fore-and-aft motion of the plate 30 during rotation of the cranks. Hydraulic motor 35 actuation thus moves the plate 30 out of or into aileron 17 under power supplied from motors 26 or 29.

The valve 36 of plate motor 35, 36, 37 is controlled by plate motor rod 40 entering the aileron 17 coaxially with the axis X thereof. Plate motor rod 40 is in turn actuated through bell crank 41 by pulley rod 42 from plate actuating pulley 43. This latter pulley 43 is connected by plate cables 44 to a force producer pulley 45 rotated by a force producer shaft 46 centrally mounted to pass through a force producer casing 47. This casing is bi-sected by a diaphragm 48 attached to shaft 46 to form two compartments 47a and 47b. The compartment 47b on one side of diaphragm 48 is connected to an airscoop 50 by ram air tube 51, scoop 50 being preferably positioned below the wing of the airplane. The other compartment 47a in the casing is connected to a source of at least static pressure, or if preferred, to a suction inlet 52 on the top of the wing. The device just above described provides a movement of shaft 46 as a function of the airspeed of the airplane. As the cables 44 are connected to control the valve 36 of the motor cylinder 35 to retract the plate 30 completely into the aileron 17 at the higer points on the speed range, and extend the plate at the lower points on the speed range, the amount of control surface area can be made adequate at all speeds and without extreme stick sensitivity at any speed. A compression spring assembly 55 attached to bell crank 41 and secured to airframe 5 insures that the plate 30 will be fully extended at all times when the differential pressure on diaphragm 48 is not sufficient to provide accurate plate 30 position control. Cables 44a are used to control the plate motor in the other aileron (not shown).

Because the plate motor rod 40 extends coaxial with the aileron hinge axis X, and because of the rotatable threaded connection 53 in the rod 40, movement of the aileron 17 has a negligible effect upon operation of the linkage of the valve 36.

In general, it can be stated that an increase in control element area of from 20% to 30% will make the high speed control element area substantially effective for control at take-off and landing speeds.

By adjustment of motion ratios between pulleys 45 and 43, in the connection between the force producer 46, 47, 48, and the plate motor valve 36, any desired characteristic of aerodynamic response to stick movement can be set up, over either the entire speed range or over a portion thereof, as may be desired. In addition, the plate 30 may be manually controlled by the pilot. In any event the desirable features of the invention are attained by making the aileron 17, when at minimum area at high speeds, of the best possible aerodynamic configuration. True airfoil section and some efficiency of the aileron 17 is lost when the plate 30 is extended, as shown in dotted line Figure 2, but as minimum efficiency occurs only at the lower end of the speed range, such efficiency loss is not serious and is more than made up for by the efficiency gain and ease of control at the higher speeds at which, by far, the greatest flying time is spent.

It is noted that change in aileron, elevator or rudder area, as provided for herein, may change the center of pressure on the control element, and thus possibly require a trim change. However, as a substantial speed change in an airplane usually requires trimming in any event, such trim changes can readily be made, as is well known in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In an attitude control system for an airplane having a wide speed range; an attitude control surface, a pilot's control member, means connecting said member to said surface for pilot control of said airplane, the surface area of said control surface being sufficient only to control said airplane under normal pilot control member movements at the higher points of said speed range, a plate mounted to slide rearwardly out of and forwardly into said control surface to respectively increase and decrease the control area of said control surface, actuating means mounted within said control surface and operatively connected to said plate to move said plate rearwardly and forwardly, said actuating means having a reciprocative input driving member positioned in line with a hinge axis of deflection of said control surface, an operating linkage mounted outside said control surface and connected through the forward part of said control surface to said input driving member, said input driving member being divided, between two end connections thereof, into two parts coaxially rotatable with respect to each other whereby deflection of said control surface is allowed without affecting operation of said plate, airspeed-responsive acivating means, and means operatively connecting said activating means to said operating linkage in the direction to cause movement of said plate forwardly into said control surface at high speeds and rearwardly out of said control surface at low speeds.

2. Apparatus in accordance with claim 1 wherein said actuating means for said plate is a full power-operated servomotor controlled and positioned by the position of said reciprocative input driving member, and wherein said airspeed-responsive activating means has a movable output member continuously positioned in accordance with airspeed, said connecting means for said operating linkage being attached to said output member, whereby the effective exposed area of said control surface is continuously proportional to a function of airspeed.

3. In a high speed airplane, a main attitude control surface hinged to move on both sides of a neutral position in accordance with the direction, amount and rate of movement of a pilot's control member, said main control surface having an airfoil section and having an area sufficient to control said airplane at the higher end of the speed range of said airplane, said area being insufficient to properly control said airplane at the lower end of the speed range thereof, an auxiliary control surface element movable from a first position substantially within said main control surface to a second position projecting from said main surface a sufficient distance and in a direction to provide sufficient additional control surface area to provide adequate attitude control of said airplane at the lower end of the speed range thereof, airspeed measuring means remotely located from said main control surface and having a movable output member continuously positioned in accordance with airspeed, and motion transmitting means operatively connected between said output member and said auxiliary control surface element, said motion transmitting means including a full power-operated servomotor and a reciprocative driving element positioned coaxially with the hinge line of said main control surface, said motion transmitting means entering said main control surface through a forward portion thereof.

4. Apparatus in accordance with claim 3 wherein said reciprocative driving element is provided with joining means rotatable about said hinge line, whereby operation of said auxiliary control surface element is operated independently of the control movements of said main control surface in changing the flight attitude of said airplane.

5. Means for maintaining constant the aerodynamic control effect of a hinged airplane control surface operable by a pilot, which comprises an auxiliary surface element mounted within said control surface and movable rearwardly partially out of and forwardly into said control surface to respectively increase and decrease the total effective control surface area, a hydraulic piston and cylinder assembly mounted internally of said control surface with the piston rod end fixed to the leading edge thereof, an actuating linkage connected between the movable cylinder end and said auxiliary surface element to extend and retract said auxiliary surface element when said piston and cylinder assembly is operated in opposite respective directions, a valve housing integral with said movable cylinder end, a reciprocative rod from said valve housing extending coaxially with the hinge line of said control surface, a rotatable connection in said rod, a crank member pivotally connected to the end of said rod substantially at a right angle and extending forwardly through the leading edge of said control surface, airspeed measuring means mounted remotely from said control surface and having a movable output member continuously positioned in accordance with airspeed, and an operating connection between said movable output member and said crank member, whereby the total effective surface area of said control surface is automatically and continuously regulated to be larger at lower airspeeds and smaller at high airspeeds, independently of the deflected positions of said control surface as operated by the pilot.

References Cited in the file of this patent

UNITED STATES PATENTS

| | | |
|---|---|---|
| 1,209,923 | Wragg | Dec. 26, 1916 |
| 1,710,671 | Bonney | Apr. 23, 1929 |
| 2,205,610 | Van Nes | June 25, 1940 |
| 2,272,664 | Gropler | Feb. 10, 1942 |
| 2,420,433 | Kraaymes | May 13, 1947 |
| 2,445,343 | Tyra | July 20, 1948 |
| 2,523,427 | Hampshire | Sept. 26, 1950 |
| 2,583,405 | Youngman | Jan. 22, 1952 |
| 2,608,364 | Gordon et al. | Aug. 26, 1952 |
| 2,643,832 | Thwaites | June 30, 1953 |

FOREIGN PATENTS

| | | |
|---|---|---|
| 657,600 | Germany | Mar. 9, 1938 |